Ⅱ US009160731B2

(12) United States Patent  (10) Patent No.: US 9,160,731 B2
Chang et al.  (45) Date of Patent: Oct. 13, 2015

(54) ESTABLISHING A TRUST RELATIONSHIP BETWEEN TWO PRODUCT SYSTEMS

(71) Applicant: International Business Machines Corporation, Armonk, NY (US)

(72) Inventors: John Y. Chang, Austin, TX (US); Ching-Yun Chao, Austin, TX (US); Lewis Lo, Toronto (CA); Ki H. Park, Cary, NC (US); Barbara J. Vander Weele, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 14/019,836

(22) Filed: Sep. 6, 2013

(65) Prior Publication Data

US 2015/0074395 A1  Mar. 12, 2015

(51) Int. Cl.
*H04L 9/32* (2006.01)
*G06F 7/04* (2006.01)
*H04L 29/06* (2006.01)
(Continued)

(52) U.S. Cl.
CPC ............ *H04L 63/08* (2013.01); *H04L 63/0428* (2013.01); *H04L 63/10* (2013.01); *G06F 21/6218* (2013.01); *H04L 9/08* (2013.01); *H04L 63/108* (2013.01)

(58) Field of Classification Search
CPC ....... H04L 63/08; H04L 63/0428; H04L 9/08; H04L 63/108; G06F 21/6218
USPC .................................................. 713/168, 170
See application file for complete search history.

(56) References Cited

U.S. PATENT DOCUMENTS 8,108,920 B2   1/2012  Spelman et al.
2012/0144501 A1  6/2012  Vangpat et al.
(Continued)

FOREIGN PATENT DOCUMENTS

CN       102761537 A   10/2012
CN       103139181 A   6/2013
WO   WO 2007/090866 A1   8/2007

OTHER PUBLICATIONS

"OAuth 2.0", http://oauth.net/2/, retrieved Jun. 18, 2013, 3 pages.
Corella, PhD, Francisco et al., "SAAAM: Simple Authentication and Authorization in the Age of Mobile", White Paper, Renamed from SimpleAuth, revised Jun. 26, 2012, 29 pages.
(Continued)

*Primary Examiner* — Aravind Moorthy
(74) *Attorney, Agent, or Firm* — Francis Lammes; Stephen J. Walder, Jr.; Parahos T. Kalaitzis

(57) ABSTRACT

A mechanism is provided for establishing a trust relationship between two products. A resource device receives a registration request from an application device to access a resource on the resource device by an application and users of the application on the application device. The resource device sends a registration response using a redirection uniform resource identifier (URI) provided with the registration request, where the registration response includes an authorization code and a symmetric key in response to authenticating the registration request. The resource device receives an access token request that includes the symmetric key, verifiable authentication data, and the redirection URI. The resource device sends an access token to the application device in response to validating the access token request, where the access token allows for access to the resource on the resource device thereby establishing the trust relationship between the resource device and the application device.

14 Claims, 4 Drawing Sheets

(51) Int. Cl.
*H04L 9/08* (2006.01)
*G06F 21/62* (2013.01)

(56) References Cited

U.S. PATENT DOCUMENTS

| | | |
|---|---|---|
| 2013/0047266 A1 | 2/2013 | Radhakrishnan et al. |
| 2013/0067568 A1* | 3/2013 | Obasanjo et al. ............... 726/20 |
| 2013/0191884 A1* | 7/2013 | Leicher et al. .................... 726/4 |
| 2014/0019752 A1* | 1/2014 | Yin et al. ...................... 713/155 |

OTHER PUBLICATIONS

Hardt, D., "The OAuth 2.0 Authorization Framework draft-ietf-oauth-v2-31", http://tools.ietf.org/html/draft-ietf-oauth-v2-31 dated Jul. 31, 2012, retrieved Jun. 18, 2013, 72 pages.

Lomotey, Richard K. et al., "Middleware-Layer for Authenticating Mobile Consumers of Amazon S3 Data", IEEE Computer Society, 2013 IEEE International Conference on Cloud Engineering, 2013, pp. 108-113.

* cited by examiner

ESTABLISHING A TRUST RELATIONSHIP BETWEEN TWO PRODUCT SYSTEMS

BACKGROUND

The present application relates generally to an improved data processing apparatus and method and more specifically to mechanisms for establishing a trust relationship between two independent products so that users of one product are authorized to use resources provided by the other product.

Computer systems often have various roles and relationships. For example, one computer system may operate as an email server, a web server, or a domain controller, while another computer system may operate as a client. Some computer systems may have authority to perform actions, such as authenticating other computer systems, not granted to other computer systems. One type of relationship is a trust relationship, in which a trustee establishes that a particular computer system is trusted to perform one or more actions.

SUMMARY

In one illustrative embodiment, a method, in a data processing system, is provided for establishing a trust relationship between two products. The illustrative embodiment receives, by a resource device, a registration request from an application device to access a resource on the resource device by an application and users of the application on the application device. Responsive to authenticating the registration request, the illustrative embodiment sends, by the resource device, a registration response using a redirection uniform resource identifier (URI) provided with the registration request. In the illustrative embodiment, the registration response includes an authorization code and a symmetric key. The illustrative embodiment receives, by the resource device, an access token request that includes the symmetric key, verifiable authentication data, and the redirection URI. Responsive to validating the access token request, the illustrative embodiment sends, by the resource device, an access token to the application device. In the illustrative embodiment, the access token allows the application and users of the application to access the resource on the resource device thereby establishing the trust relationship between the resource device and the application device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
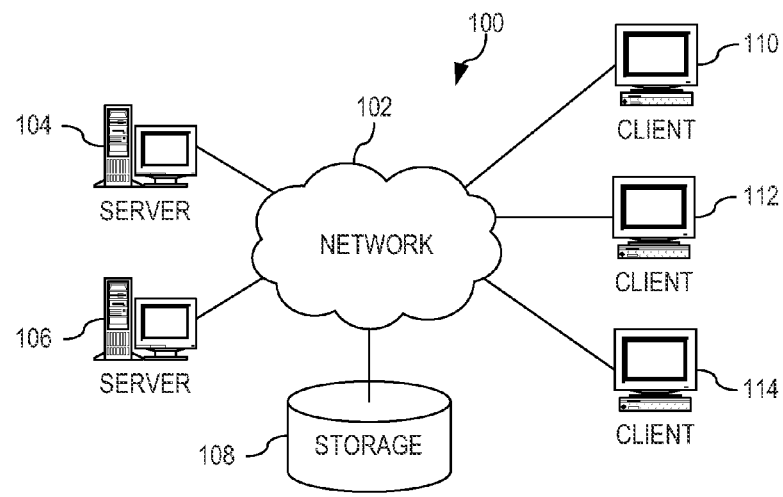
FIG. 1 is an example diagram of a distributed data processing system in which aspects of the illustrative embodiments may be implemented.

A simple solution widely used generating trust relationships, largely because of its simplicity, is to configure two products, product A and product B, to use a common user registry and common user authentication credentials. From a trust relationship perspective, the two products share a same user population and hence basically completely trust each other's users. However, this solution does not address usage scenarios and a conceptual model that a user of product A is authorized to use resources of product B only because the user is authorized by product A, not because the user is authorized by product B.

To avoid the limitation of using a common user registry, the two products may keep their own user registry and establish trust relationship by sharing a common secret between them. When product A propagates its user security identity to product B, product A uses the common secret to enable product B to validate the trust relationship. However, this solution has a couple of drawbacks. First, the mechanism of sharing a secret varies from product to product and, hence, adds to complexity and cost. Second, product B needs to map product A user identity to some identity that may be used in its own resource authorization. This again adds to development and management complexity and cost.

Another solution uses a trusted third party to resolve the above limitations. Essentially, the two products must first both establish a trust relationship with the third party trust service provider. A user of product A can then request security credentials from the trust service provider. The trust service provider issues a security credential to the user based on its trust relationship with Product A. The user then uses the security credential to access Product B's resources. Product B authorizes the user based on its trust relationship with the third party trust service. This alternative solution avoids sharing user registry between product A and product B. However, this alternative solution also has a couple of drawbacks. First, the alternative solution requires using a third party trust service provider which adds to complexity and cost. Second, the alternative solution still needs to establish a trust relation between each product and the third party trust service provider and, in that sense, does not really address the basic problem to establish trust relationship between two independent products so that users of one product are authorized to use resources provided by the other product. Third, product B more than likely still needs to perform resource authorization using an identity asserted by the third party trust service.

The illustrative embodiments provide for establishing a trust relationship between two independent products so that users of one product are authorized to use resources provided by the other product. That is, the illustrative embodiments enable a trust relationship to be established between two products such that product B authorizes users of product A to use resources of product B and the user who requests product A to establish trust relationship with product B is a different user from the user who authorizes product B to trust product A and users of product A. Thus, for example, the extension created by the illustrative embodiments enables a product A administrator to request establish trust relationship with product B and a product B administrator to authorize the request and to grant the permission to form the trust relationship, with the caveat that the product A administrator and product B administrator does not need to be the same user. Supporting different administrators in product A and in product B better fits the enterprise usage scenarios and the separation of duties best practice.

Figure 2:
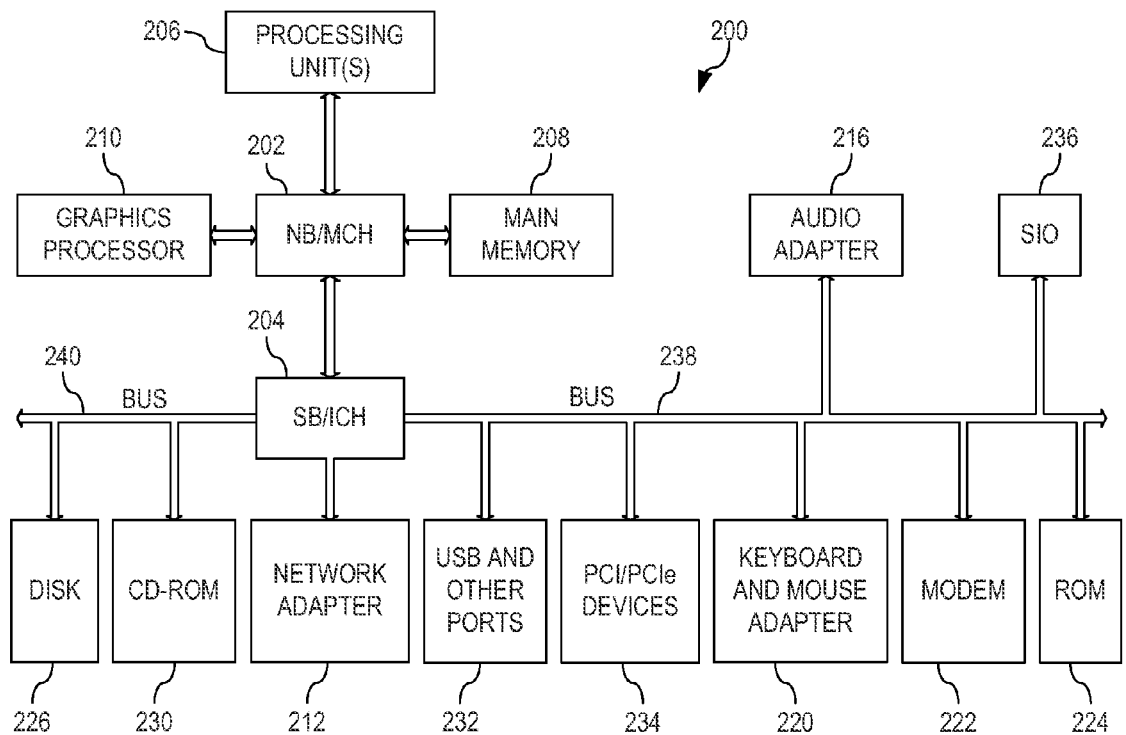
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PO uses a card bus controller, white PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit an scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
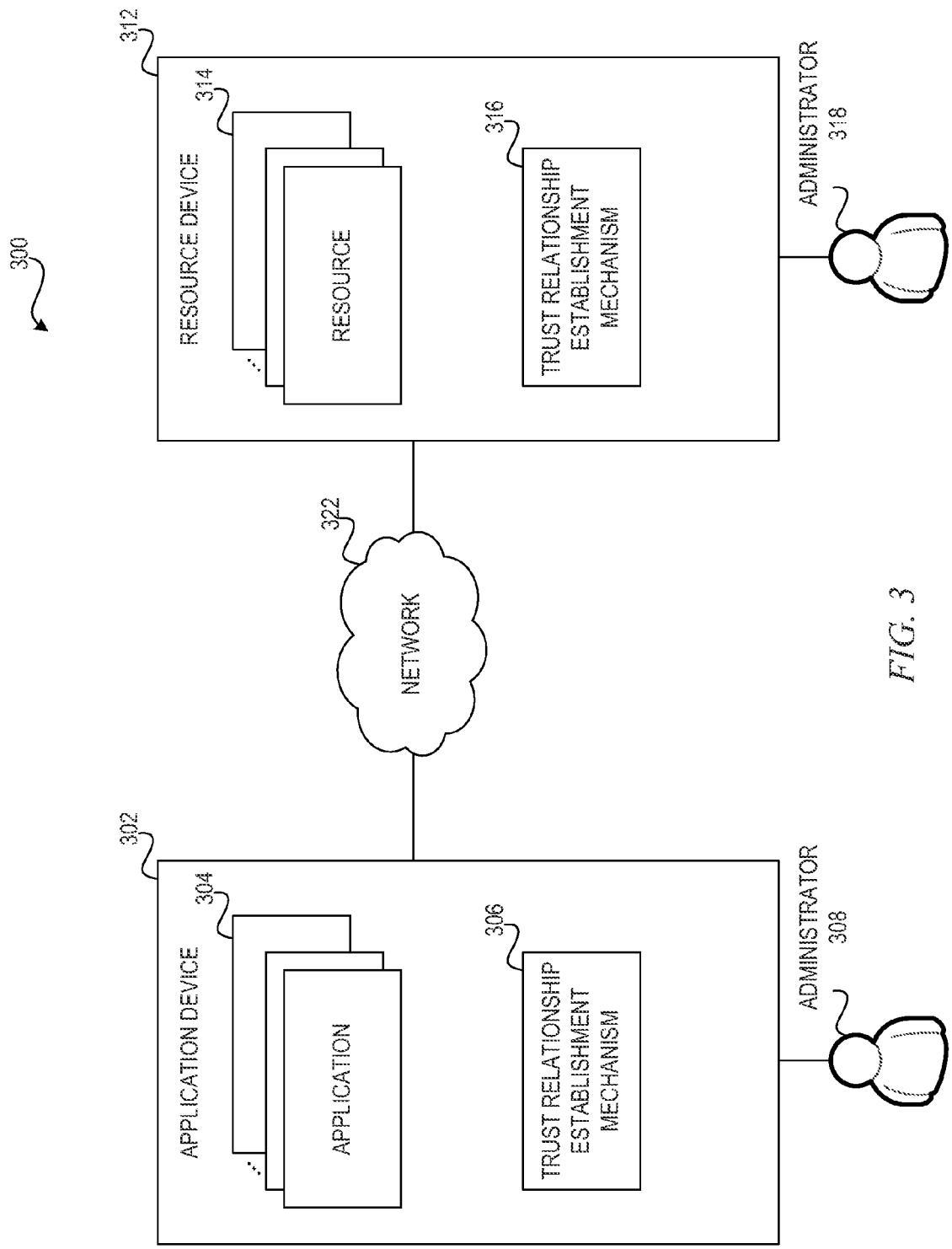
FIG. 3 depicts a functional block diagram of trust relationship establishment mechanism in accordance with an illustrative embodiment.

FIG. 3 depicts a functional block diagram of trust relationship establishment mechanism in accordance with an illustrative embodiment. Data processing system 300 comprises device 302 and device 312, which are computing devices in communication with each other over network 322. Device 302 comprises a set of applications 304 of which users of one or more applications of the set of applications 304 need to access one or more resources in a set of resources 314 comprised within device 312. In order that one or more applications in device 302 may access one or more resources in device 312, trust relationship establishment mechanism 306 in conjunction with trust relationship establishment mechanism 316 provide for establishing a trust relationship between the one or more applications and the one or more resources.

To establish the trust relationship, administrator 308 of device 302 initiates a registration request to register the one or more applications with the one or more resources via a user interface (UI) to trust relationship establishment mechanism 306. Administrator 308 may include in the registration request one or more registration artifacts, such as a redirection uniform resource identifier (URI), a requested scope that identifies a role of the requesting one or more applications, a local state of device 302, an identifier representing the administrator 308, a public key or certificate for the one or more applications, any additional authentication data associated with the application or the user of the application, the one or more resources to be accessed, or the like. Administrator 308 may then submit the registration request and, by sending the registration request via trust relationship establishment mechanism 306, trust relationship establishment mechanism 306 may send the registration request to trust relationship establishment mechanism 316 as an authorized registration request. Those skilled in the art will recognize that trust relationship establishment mechanism 306 may send additional credential data in the registration request to trust relationship establishment mechanism 316 to enable trust relationship establishment mechanism 316 to validate authenticity of subsequent request in a next trust establishment operation.

Upon trust relationship establishment mechanism 316 receiving the registration request from trust relationship establishment mechanism 306, trust relationship establishment mechanism 316 validates that the registration request is a valid registration request from an associated trust relationship establishment mechanism. If the registration request is validated, then trust relationship establishment mechanism 316 imports the one or more registrations artifacts associated with the authorized registration request and presents the registration request to administrator 318 via a user interface (UI). Upon administrator 318 approving/granting access of the one or more applications to the one or more resources sends a registration response back to trust relationship establishment mechanism 306 via trust relationship establishment mechanism 316 using the redirection URI provided by the trust relationship establishment mechanism 306. The registration response includes an authorization code and any local state provided by trust relationship establishment mechanism 306. The authorization code may be encrypted by a symmetric key. The symmetric key being a one-time use key that is generated per request and has an expiration time period.

Upon trust relationship establishment mechanism 306 receiving the registration response from trust relationship establishment mechanism 316, trust relationship establishment mechanism 306 generates an access token request to be sent to trust relationship establishment mechanism 316. The access token request includes the redirection URI, verifiable authentication data, as well as the symmetric key. Trust relationship establishment mechanism 306 then submits the access token request using the authorization code previously received from trust relationship establishment mechanism 316 and sends the access token request to trust relationship establishment mechanism 316. Further, by sending the access token request via trust relationship establishment mechanism 306, trust relationship establishment mechanism 306 may send the access token request to trust relationship establishment mechanism 316 as an authorized access token request. Those skilled in the art will recognize that trust relationship establishment mechanism 306 may use credential data sent to the trust relationship establishment mechanism 316 in a previous operation to create verifiable authentication data in the access token request.

Upon trust relationship establishment mechanism 316 receiving the access token request from trust relationship establishment mechanism 306, trust relationship establishment mechanism 316 validates that the access token request is an authorized registration request from an associated trust relationship establishment mechanism by verifying the authorization code. If the access token request is validated, then trust relationship establishment mechanism 316 verifies that the redirection URI included with the access token request matches the redirection URI provided with the registration request. If trust relationship establishment mechanism 316 verifies that the redirection URI included with the access token request is the same as the redirection URI provided with the registration request, the trust relationship establishment mechanism 316 sends an access token back to trust relationship establishment mechanism 306 via trust relationship establishment mechanism 316. The access token does not have an expiration time period and is signed with a token issuer public key. Those skilled in the art will recognize that a finite expiration time and a renewal token may be used to renew the access token in another embodiment. As will be appreciated by one skilled in the art, the access token may be used by resource-side system to grant application side devices and users authorized access to resource side resources.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the tatter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
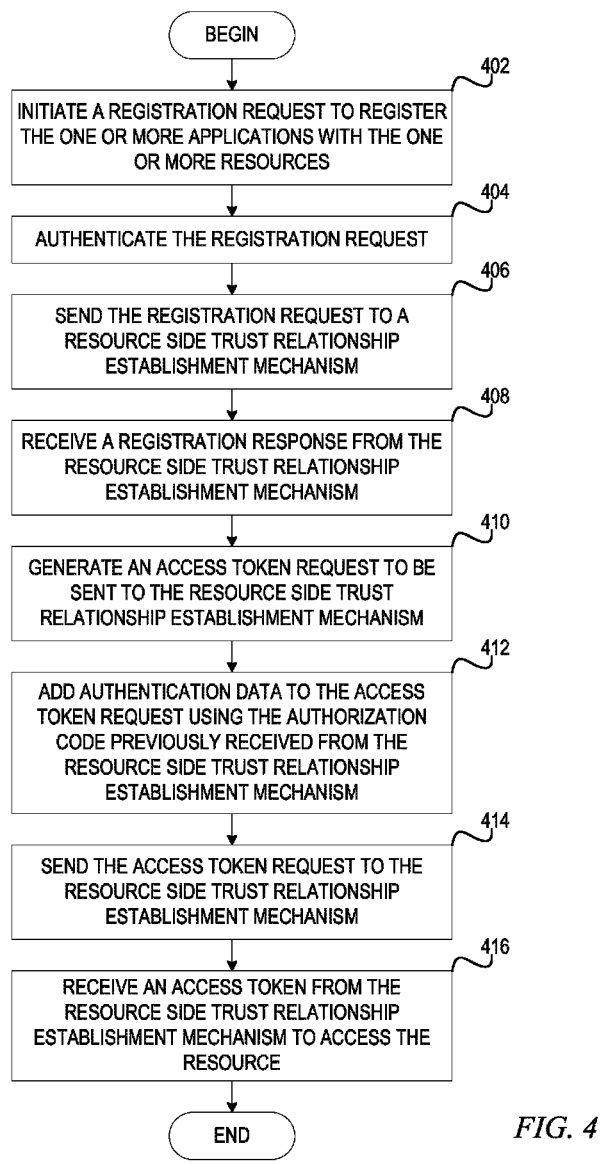
FIG. 4 depicts a flowchart of the operation performed by an application side trust relationship establishment mechanism in accordance with an illustrative embodiment.

FIG. 4 depicts a flowchart of the operation performed by an application side trust relationship establishment mechanism in accordance with an illustrative embodiment. As the operation begins, the application side trust relationship establishment mechanism initiates a registration request to register the one or more applications with the one or more resources (step 402). The registration request may include one or more registration artifacts, such as a redirection uniform resource identifier (URI), a requested scope that identifies a role of the requesting one or more applications, a local state of a device with which the application side trust relationship establishment mechanism is associated, a user identifier of an administrator of the application side trust relationship establishment mechanism, a public key or certificate for the one or more applications, the one or more resources to be accessed, application authentication materials, or the like. The application side trust relationship establishment mechanism then authorizes the registration request (step 404). The application side trust relationship establishment mechanism then sends the registration request to a resource side trust relationship establishment mechanism (step 406). By sending the registration request via the application side trust relationship establishment mechanism, the application side trust relationship establishment mechanism sends the registration request to the resource side trust relationship establishment mechanism as an authorized registration request.

If the registration request is granted, the application side trust relationship establishment mechanism receives a registration response from the resource side trust relationship establishment mechanism (step 408). The application side trust relationship establishment mechanism generates an access token request to be sent to the resource side trust relationship establishment mechanism (step 410). The access token request includes the redirection URI as well as the symmetric key. The application side trust relationship establishment mechanism adds authentication data to the access token request using the authorization code previously received from the resource side trust relationship establishment mechanism and other authentication material (step 412). The application side trust relationship establishment mechanism sends the access token request to the resource side trust relationship establishment mechanism (step 414). By sending the access token request via application side trust relationship establishment mechanism, the application side trust relationship establishment mechanism sends the access token request to the resource side trust relationship establishment mechanism as an authorized and verifiable access token request.

If the access token request is validated by the resource side trust relationship establishment mechanism, the application side trust relationship establishment mechanism receives an access token from the resource side trust relationship establishment mechanism to access the resource (step 416), with the operation terminating thereafter. The access token does not have an expiration time period and is signed by with a token issuer public key.

Figure 5:
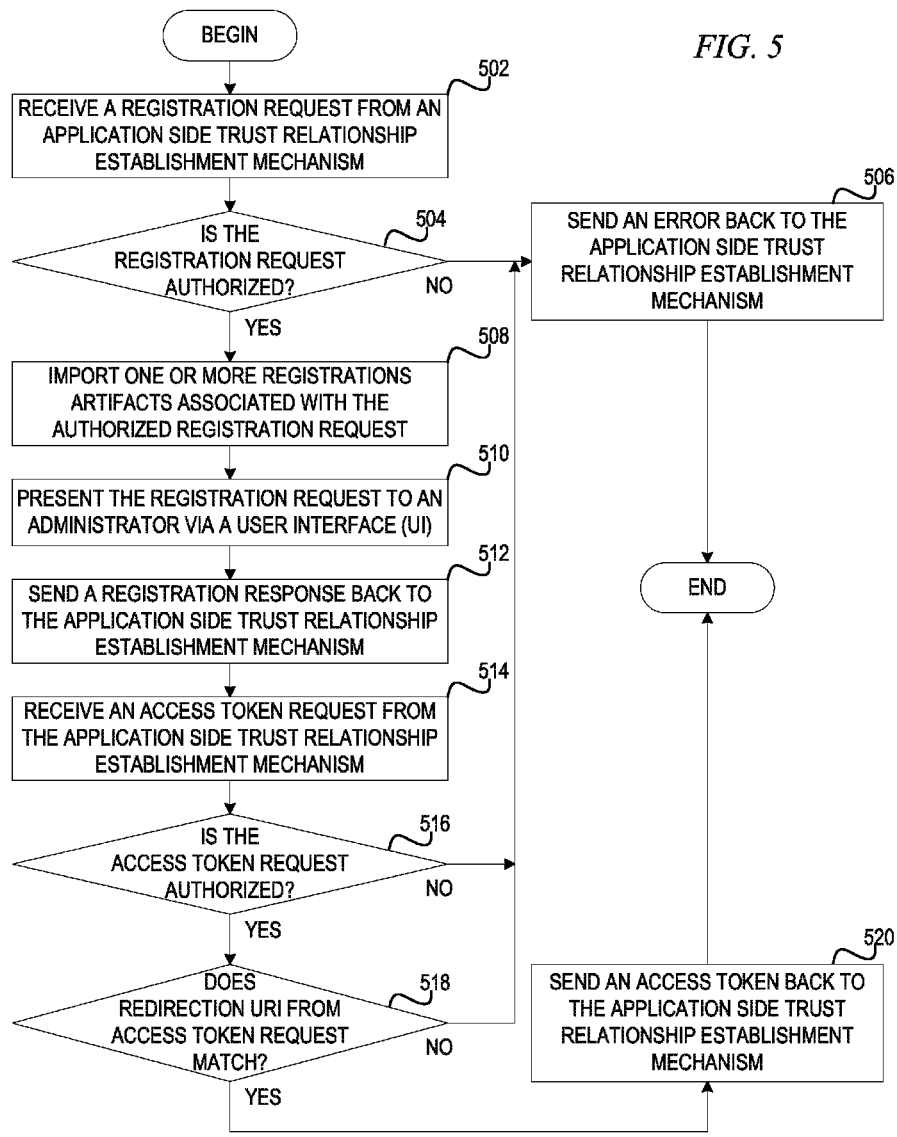
FIG. 5 depicts a flowchart of the operation performed by a resource side trust relationship establishment mechanism in accordance with an illustrative embodiment.

FIG. 5 depicts a flowchart of the operation performed by a resource side trust relationship establishment mechanism in accordance with an illustrative embodiment. As the operation begins, the resource side trust relationship establishment mechanism receives a registration request from an application side trust relationship establishment mechanism (step 502). The resource side trust relationship establishment mechanism validates that the registration request is an authorized registration request (step 504). If at step 504 the validation fails, then the resource side trust relationship establishment mechanism sends an error back to the application side trust relationship establishment mechanism (step 506), with the operation terminating thereafter. If at step 504 the registration request is validated, then the resource side trust relationship establishment mechanism imports the one or more registrations artifacts associated with the authorized registration request (step 508) and presents the registration request to an administrator via a user interface (UI) (step 510).

Upon the administrator approving/granting access to the one or more resources, the resource side trust relationship establishment mechanism sends a registration response back to the application side trust relationship establishment mechanism using the redirection URI provided by the application side trust relationship establishment mechanism (step 512). The registration response includes an authorization code and any local state provided by the application side trust relationship establishment mechanism. The authorization code may be encrypted by a symmetric key. The symmetric key being a one-time use key that is generated per request and has an expiration time period.

The resource side trust relationship establishment mechanism then receives an access token request from the application side trust relationship establishment mechanism (step 514). The resource side trust relationship establishment mechanism validates that the access token request is an authorized registration request from an associated trust relationship establishment mechanism by verifying the authorization code (step 516). If at step 516 the validation fails, then the operation proceeds to step 506, with the operation terminating thereafter. If at step 516 the access token request is validated, then the resource side trust relationship establishment mechanism verifies that the redirection URI included with the access token request matches the redirection URI provided with the registration request (step 518). If at step 518 the redirection URI included with the access token request ails to be the same as the redirection URI provided with the registration request, then the operation proceeds to step 506, with the operation terminating thereafter.

If at step 518 the resource side trust relationship establishment mechanism verifies that the redirection URI included with the access token request is the same as the redirection URI provided with the registration request, then the resource side trust relationship establishment mechanism sends an access token back to the application side trust relationship establishment mechanism (step 520), with the operation ending thereafter. The access token does not have an expiration time period and is signed by with a token issuer public key.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for establishing a trust relationship between two independent products so that users of one product are authorized to use resources provided by the other product. That is, the illustrative embodiment enables a trust relationship to be established between users of an application one device to use resources on a different device. Further, the user who requests the application establish a trust relationship with the resource is a different user from the user who authorizes the resource to be accessed by the application.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for establishing a trust relationship between two products, the method comprising:
   receiving, by a resource device, a registration request from an application device to access a resource on the resource device by an application and users of the application on the application device;
   responsive to authenticating the registration request, sending, by the resource device, a registration response to the application device using a redirection uniform resource identifier (URI) provided with the registration request, wherein the registration response includes an authorization code and a symmetric key, wherein the authorization code in the registration response is encrypted by the symmetric key and wherein the symmetric key is a one-time use key that is generated per request and has an expiration time period;
   receiving, by the resource device, an access token request from the application device that includes the symmetric key, verifiable authentication data, and the redirection URI;
   validating that the redirection URI included with the access token request matches the redirection URI used to send the registration response prior to sending the access token to the application device; and
   responsive to validating the access token request, sending, by the resource device, an access token to the application device, wherein the access token allows the application and users of the application to access the resource on the resource device thereby establishing the trust relationship between the resource device and the application device.

2. The method of claim 1, wherein the access token does not have an expiration time period and wherein the access token is signed by with a token issuer public key.

3. The method of claim 1, wherein the access token has a finite expiration time and wherein the access token is renewable via usage of an additional renewal token.

4. The method of claim 1, wherein the registration request includes a set of registration artifacts and wherein the set of registration artifacts comprises one or more of the redirection URI, a requested scope that identifies a role of the application, a local state of the application device, an identifier of an administrator of the application device, a public key or certificate for the application, any additional authentication data associated with the application or the user of the application, or the resource to be accessed on the resource device.

5. The method of claim 1, wherein the registration request is authenticated by an administration of the application device and authorized by application side trust relationship establishment mechanism prior to the registration request being sent to the resource device.

6. The method of claim 1, wherein the application device adds authentication data to the access token request using the authorization code and any other additional application authentication data prior to sending the request to the resource device.

7. A computer program product comprising a computer readable storage medium having a computer readable program stored therein, wherein the computer readable program, when executed on a computing device, causes the computing device to:
   receive a registration request from an application device to access a resource on a resource device by an application and users of the application on the application device;
   responsive to authenticating the registration request, send a registration response to the application device using a redirection uniform resource identifier (URI) provided with the registration request, wherein the registration response includes an authorization code and a symmetric key, wherein the authorization code in the registration response is encrypted by the symmetric key and wherein the symmetric key is a one-time use key that is generated per request and has an expiration time period;
   receive an access token request from the application device that includes the symmetric key, verifiable authentication data, and the redirection URI;
   validate that the redirection URI included with the access token request matches the redirection URI used to send the registration response prior to sending the access token to the application device; and
   responsive to validating the access token request, send an access token to the application device, wherein the access token allows the application and users of the application to access the resource on the resource device thereby establishing the trust relationship between the resource device and the application device.

8. The computer program product of claim 7, wherein the registration request includes a set of registration artifacts and wherein the set of registration artifacts comprises one or more of the redirection URI, a requested scope that identifies a role of the application, a local state of the application device, an identifier of an administrator of the application device, a public key or certificate for the application, any additional authentication data associated with the application or the user of the application, or the resource to be accessed on the resource device.

9. The computer program product of claim 7, wherein the registration request is authenticated by an administration of the application device and authorized by application side trust relationship establishment mechanism prior to the registration request being sent to the resource device.

10. The computer program product of claim 7, wherein the application device adds authentication data to the access token request using the authorization code and any other additional application authentication data prior to sending the request to the resource device.

11. An apparatus comprising:
a processor; and
a memory coupled to the processor, wherein the memory comprises instructions which, when executed by the processor, cause the processor to:
receive a registration request from an application device to access a resource on a resource device by an application and users of the application on the application device;
responsive to authenticating the registration request, send a registration response to the application device using a redirection uniform resource identifier (URI) provided with the registration request, wherein the registration response includes an authorization code and a symmetric key, wherein the authorization code in the registration response is encrypted by the symmetric key and wherein the symmetric key is a one-time use key that is generated per request and has an expiration time period;
receive an access token request from the application device that includes the symmetric key, verifiable authentication data, and the redirection URI;
validate that the redirection URI included with the access token request matches the redirection URI used to send the registration response prior to sending the access token to the application device; and
responsive to validating the access token request, send an access token to the application device, wherein the access token allows the application and users of the application to access the resource on the resource device thereby establishing the trust relationship between the resource device and the application device.

12. The apparatus of claim 11, wherein the registration request includes a set of registration artifacts and wherein the set of registration artifacts comprises one or more of the redirection URI, a requested scope that identifies a role of the application, a local state of the application device, an identifier of an administrator of the application device, a public key or certificate for the application, any additional authentication data associated with the application or the user of the application, or the resource to be accessed on the resource device.

13. The apparatus of claim 11, wherein the registration request is authenticated by an administration of the application device and authorized by application side trust relationship establishment mechanism prior to the registration request being sent to the resource device.

14. The apparatus of claim 11, wherein the application device adds authentication data to the access token request using the authorization code and any other additional application authentication data prior to sending the request to the resource device.

* * * * *